(12) United States Patent
Abu Qahouq et al.

(10) Patent No.: US 9,330,826 B1
(45) Date of Patent: May 3, 2016

(54) INTEGRATED ARCHITECTURE FOR POWER CONVERTERS

(75) Inventors: Jaber A. Abu Qahouq, Tuscaloosa, AL (US); Yang-Ki Hong, Tuscaloosa, AL (US); Seok Bae, Ansan (KR)

(73) Assignee: The Board of Trustees of the University of Alabama for and on behalf of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 13/027,081

(22) Filed: Feb. 14, 2011

Related U.S. Application Data

(60) Provisional application No. 61/304,012, filed on Feb. 12, 2010.

(51) Int. Cl.
 *H01F 5/00* (2006.01)
 *H01F 17/00* (2006.01)
 *H01F 27/28* (2006.01)

(52) U.S. Cl.
 CPC ........ *H01F 17/0013* (2013.01); *H01F 17/0006* (2013.01); *H01F 27/2804* (2013.01)

(58) Field of Classification Search
 USPC ......... 363/16, 17, 39; 336/182, 200, 232, 181
 See application file for complete search history.

(56) References Cited

U.S. PATENT DOCUMENTS

| 4,133,025 A | 1/1979 | Wurzburg |
| 5,336,921 A | 8/1994 | Sundaram et al. |
| 5,461,353 A | 10/1995 | Eberhardt |
| 5,572,416 A | 11/1996 | Jacobs et al. |
| 5,912,552 A | 6/1999 | Tateishi |
| 6,021,050 A | 2/2000 | Ehman et al. |
| 6,563,296 B2 | 5/2003 | Cooke |
| 6,593,841 B1 | 7/2003 | Mizoguchi et al. |
| 6,900,995 B2 | 5/2005 | Muegge et al. |
| 7,187,263 B2 | 3/2007 | Vinciarelli |
| 7,221,251 B2 | 5/2007 | Menegoli et al. |
| 7,268,659 B2 | 9/2007 | Nishio et al. |
| 7,292,126 B2 | 11/2007 | So |
| 7,342,477 B2 | 3/2008 | Brandt et al. |
| 7,355,264 B2 | 4/2008 | Degani et al. |
| 7,474,189 B1 * | 1/2009 | Dening et al. ............... 336/200 |
| 7,772,819 B2 * | 8/2010 | Abu Qahouq et al. ......... 323/282 |
| 7,907,044 B2 * | 3/2011 | Tada et al. .................... 336/200 |
| 8,058,960 B2 * | 11/2011 | Hebert et al. ................. 336/200 |
| 2002/0113682 A1 | 8/2002 | Gevorgian et al. |
| 2003/0156003 A1 | 8/2003 | Sortor |
| 2004/0062066 A1 | 4/2004 | Crocker |
| 2005/0024838 A1 | 2/2005 | Maxwell |
| 2006/0186983 A1 * | 8/2006 | Ding et al. .................... 336/232 |
| 2006/0238273 A1 | 10/2006 | Tomonari et al. |
| 2007/159286 A1 | 7/2007 | Huang et al. |
| 2008/0129439 A1 | 6/2008 | Nishikawa et al. |

(Continued)

*Primary Examiner* — Nguyen Tran
(74) *Attorney, Agent, or Firm* — Maynard Cooper & Gale, P.C.; Jon E. Holland

(57) ABSTRACT

A power converter having components enclosed by legs of a first inductor is described. The first inductor is fabricated on the top surface of a substrate along the perimeter of the substrate. A second inductor is fabricated on the bottom surface of the substrate and mirrors the first inductor. Electromagnetic cancellation is provided when the current flow in the second inductor is opposite of the current flow in the first inductor.

12 Claims, 5 Drawing Sheets

(56) References Cited

U.S. PATENT DOCUMENTS

| | | |
|---|---|---|
| 2008/0130257 A1 | 6/2008 | LiPuma et al. |
| 2009/0179723 A1* | 7/2009 | Ikriannikov et al. .......... 336/200 |
| 2009/0225525 A1 | 9/2009 | Mano et al. |
| 2009/0289751 A1* | 11/2009 | Nagano et al. ................ 336/221 |
| 2009/0309687 A1 | 12/2009 | Aleksov et al. |
| 2012/0025791 A1 | 2/2012 | Abu Qahouq et al. |

* cited by examiner

INTEGRATED ARCHITECTURE FOR POWER CONVERTERS

CROSS REFERENCE TO RELATED APPLICATION

This application claims priority to U.S. Provisional Application No. 61/304,012, entitled "Integrated Architecture for Power Converters," and filed on Feb. 12, 2010, which is incorporated herein by reference.

FIELD OF THE DISCLOSURE

The present disclosure generally relates to architectures for integrated electronic components including inductors that are mounted on a substrate. The architectures are particularly applicable to a switching power converter and increases the efficiency and power density of the converter.

BACKGROUND

A direct current-to-direct current (DC-DC) power converter is typically used to supply a desired voltage and current to an electronic system. The converter receives an input voltage and delivers a regulated voltage and current. Depending on the power requirements, the DC-DC power converter may be a stand alone device, a component of an alternating current-to-direct current (AC-DC) power converter, or a component of a DC-AC power inverter. Power converters are used in a wide range of applications that include, but are not limited to, high performance computing platforms, mobile platforms, medical platforms, electric and hybrid vehicles, space power systems, military power systems and renewable energy power conversion systems.

Power converters are based on a variety of technologies including switching converters and linear regulator converters. In general, switching DC-DC power converters have the advantage of higher energy efficiency when compared with linear regulator converters. However, the switching DC-DC power converter is usually larger than a linear regulator converter because the switching converter requires magnetic devices such as power inductors and/or a power transformer. In addition, switching converters require more switching power devices and control circuits when compared to linear regulator converters. Even with such shortcomings, switching power converters are widely used, especially when conversion efficiency is crucial.

Increasing the power density of a switching converter is desirable. Power density improvements for a switching power converter can be achieved by improving the efficiency of the converter and/or reducing the size of the converter. In general, increasing the power density is achieved by making smaller power inductor and/or power transformer, making smaller switching power devices, and changing converter architecture. New and less complex control mechanisms often reduce the number and size of components required for controlling the converter. Researchers and developers are continuously working on ways to increase the power density of a switching converter.

As integrated circuits (ICs) and other loads get smaller and distributed through a system, it is often necessary to place the switching power converter near an IC or a load in a distributed architecture. In addition, new ICs and loads perform more functions that often require more energy. If components of a system are battery powered, increasing the efficiency of a switching power converter extends battery life and/or saves energy. However, it is generally undesirable for a converter to achieve an increased power density if energy efficiency is decreased and/or regulation performance compromised.

Achieving a high power density for a converter generally allows for size reduction and less weight for the power converter and the system receiving power from the converter. The size and weight of a switching converter are considered critical for a variety of devices, such as personal portable electronic devices, devices for medical applications, and devices for space applications and military systems. Further, switching converters with increased energy density have less weight and will enhance performance of electric and hybrid vehicles.

It also is important to achieve higher energy/power conversion efficiency in order to save energy related to thermal issues and to increase reliability. By increasing energy efficiency of a converter, thermal management components, such as heat sinks and cooling fans, can have size reductions. Therefore, converter improvement leads to further size and weight reduction of an overall system.

In addition, it is desirable to improve regulation performance of power converters in order to avoid system operation malfunctioning. Accordingly, it is desirable to not only increase power density but also to improve regulation performance and energy/power conversion efficiency.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

There are several known approaches for increasing the power density of a power converter. The approaches include reduction in the physical size of storage elements, i.e., capacitors and power inductors, modifying system integration architectures or methods, and reducing the number of components.

The reduction in the physical size of a power inductor is generally achieved by using improved magnetic materials, improving fabrication techniques and changing the geometric structure of the power inductor. A method for reducing the amount of inductance needed and hence an inductor physical size is to increase the switching frequency of the power converter. However, increasing the switching frequency often increases switching losses in the power converter thereby resulting in a decrease in energy efficiency. Further, switching frequencies are often limited by the technology, such as CMOS technology with defined feature sizes, used to form the power converter switching devices. In some instances, the high-frequency properties of a magnetic material of the inductor limit the switching frequency. In one exemplary embodiment, 0.25 μm CMOS technology is used for the switching power devices because of its wide use, low cost, and an ability to handle high voltages. For other embodiments, 90 nm or smaller CMOS technology allows higher switching frequencies than for the 0.25 μm CMOS technology because of smaller capacitive parasitic and larger resistive parasitic of the transistors. In other embodiments, other technologies may be used.

Figure 1:
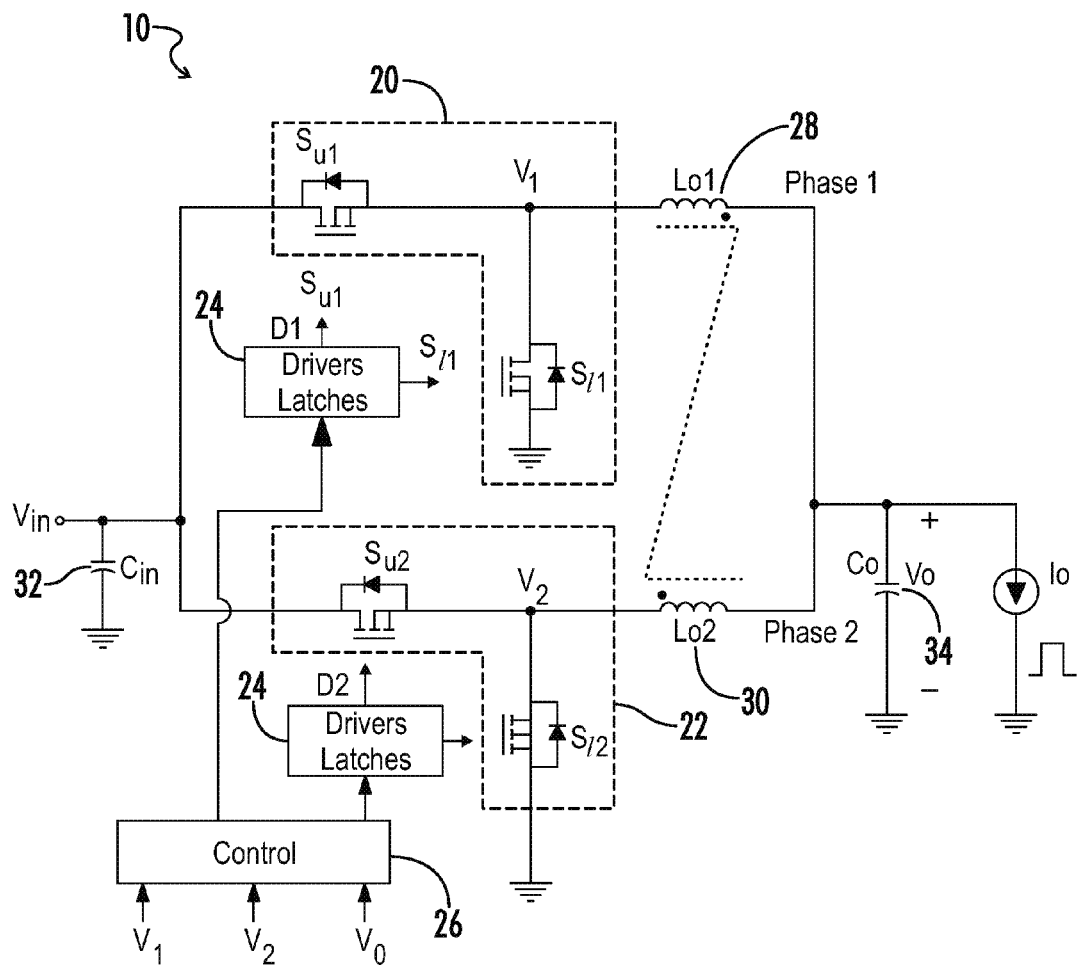
FIG. 1 is a circuit diagram for a switching converter.

FIG. 1 depicts a switching converter circuit 10 having an arrangement of components for a switching bridge DC-DC power converter. An input voltage, Vin, is coupled to switching bridges 20, 22 and filtered via an input capacitor 32. The state of switching devices, on or off, of the switching bridges 20, 22 are determined by signals from drivers 24. The drivers 24 are controlled by control signals provided by controller 26. The outputs of the switching bridges 20, 22 are coupled to respective inductors 28, 30. The outputs of the inductors 28, 30 are coupled to output capacitor 34. The voltage across output capacitor 34 is the output voltage of the converter. In another embodiment the input to the power converter is an AC source that is rectified to a DC voltage by a rectifier.

Figure 2:
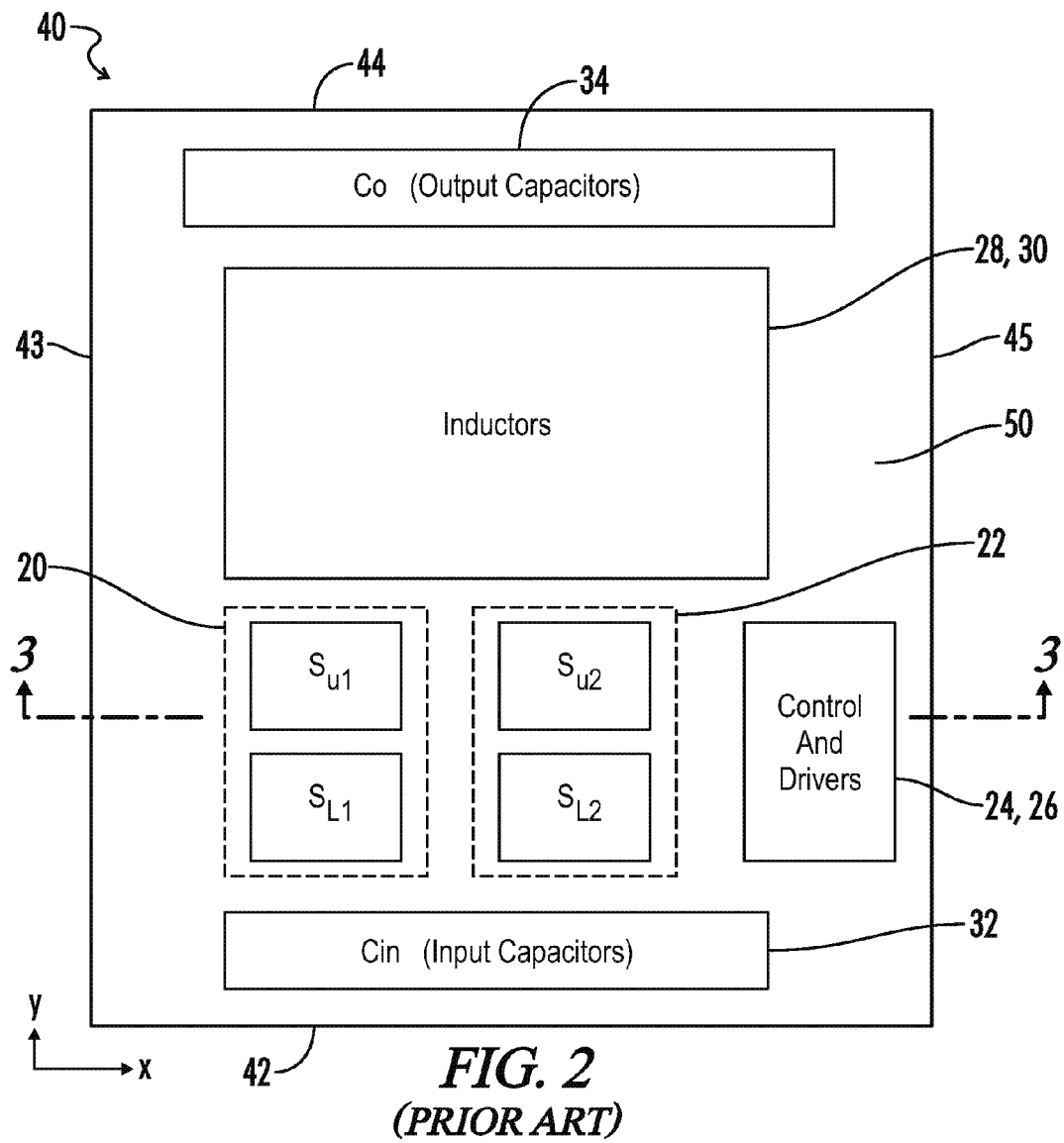
FIG. 2 depicts a conventional architecture for a switching converter.

A conventional switching converter 40 is shown in FIG. 2. Components of the converter 40 are mounted on a substrate 50. The substrate 50 has a top surface 52 and a bottom surface 54 for receiving the components of the converter. In one embodiment the substrate is a single piece of material that has only converter components. In another embodiment the substrate is a converter portion of a large substrate wherein other portions of the large substrate are used for other purposes. It is usually desirable to place the converter components close to each other so that the size of the power converter is as small possible. A first switching bridge 20 and a second switching bridge 22 are placed on one portion of the substrate 50. Adjacent to the switching bridges 20, 22 and near the lower edge 42 of the substrate 50 is input capacitor 32. The controller 26 and drivers 24 are to the right of the switching bridges. Toward the upper edge 44 of the substrate 50 are inductors 28, 30 and output capacitor 34. The components of the converter 40 are between the left edge 43 and the right edge 45 of the substrate 50. Conductors for connecting the components of the converter are not shown in FIG. 2 for simplicity of illustration. The conductors are formed by running metallic traces, such as copper, on the substrate 50.

Figure 3:
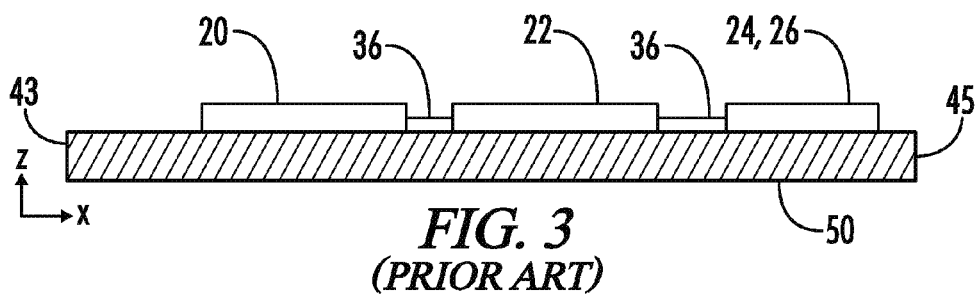
FIG. 3 is a cross-sectional view of FIG. 2.

A cross-sectional view of the conventional converter 40 is shown in FIG. 3. Examples of connecting conductors 36 are shown between switching bridges 20, 22 and between the second switching bridge 22 and the controller and drivers 26, 24.

Figure 4:
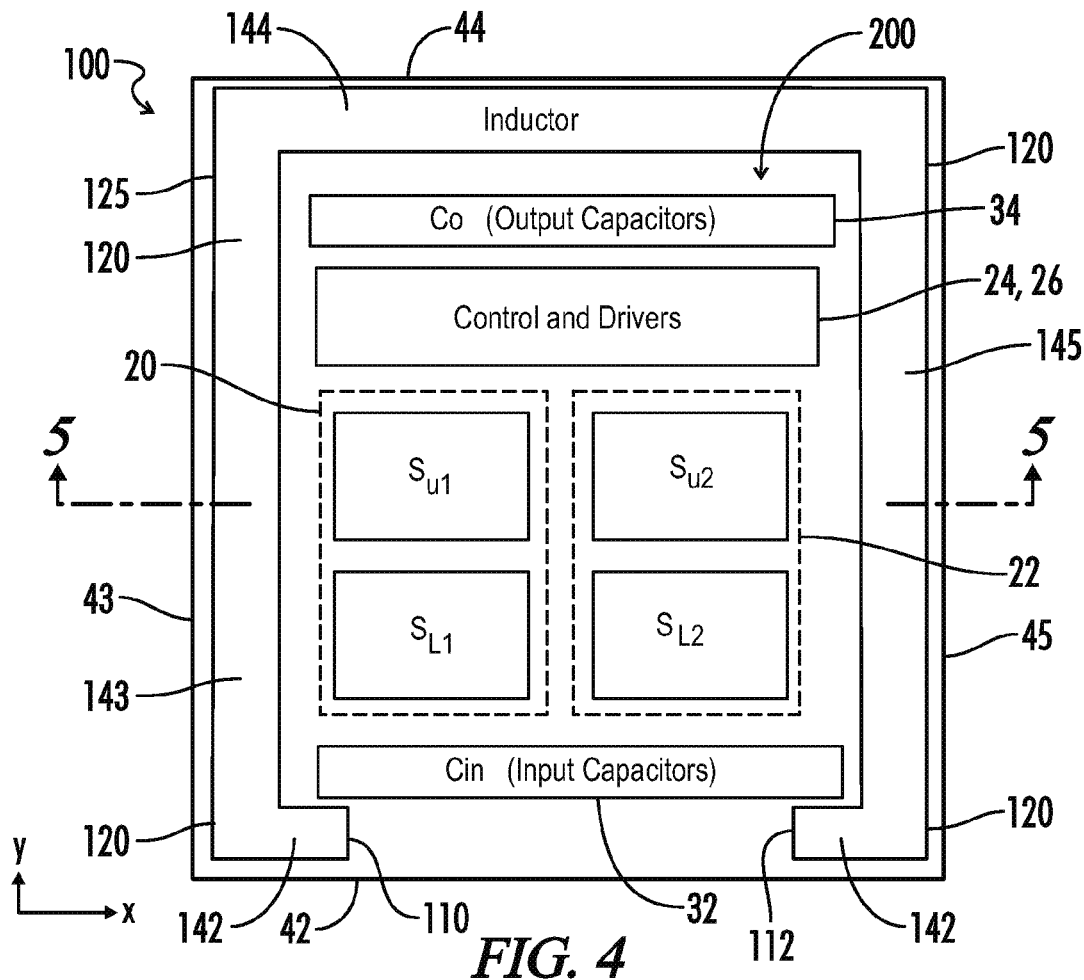
FIG. 4 depicts an embodiment of a switching converter.

An embodiment of an enclosed architecture (EA) switching converter 100 is shown in FIG. 4. The EA converter 100 has non-inductive electrical components 200 of a converter enclosed by an elongated inductor 120. The elongated inductor 120 has a U shape with the opening of the U near the lower edge of the substrate 50. In one embodiment, the exterior edges 125 of the elongated inductor 120 are adjacent to the edges 43, 44, 45 of the substrate 50. The elongated inductor 120 has a first leg 143, a second leg 144, a third leg 145 and bottom legs 142. The ends of the bottom legs 142 are nodes were current enters and leaves the inductor 120. The inside edges of the inductor legs define an interior portion 150 of the top surface 52 of substrate 50. In one embodiment, some or all of the non-inductive components are mounted in the interior portion 150 of the top surface. In another embodiment, some or all of the components are between the first leg 143 and the third leg 145 of the elongated inductor 120. As shown in FIG. 4 an input capacitor 32 is placed near the lower edge 42 of the substrate 50. Above the input capacitor 32, moving in the y-direction, are the switching bridges 20, 22. Above the switching bridges are the controller 26, drivers 24 and output capacitor 34. The inductor 120 is fabricated on the substrate 50 and runs along the edges of the substrate 50, i.e., along the perimeter of the substrate 50. A space between ends of the inductor provides connection terminals 110, 112. The other components 200 (i.e., components other than inductors 120, 121) are placed within the interior portion 150 of the substrate 50 and enclosed by the inductor 120. As with the conventional converter 40, conductors are deposited on the substrate to provide connections to complete the converter circuit 10 depicted by FIG. 1.

Figure 5:
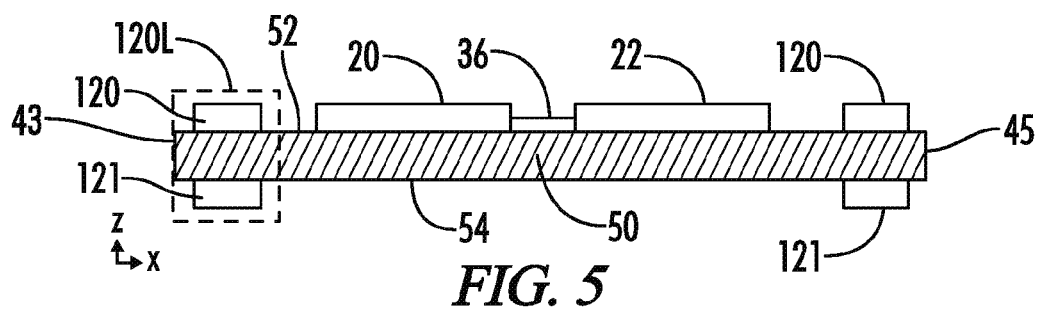
FIG. 5 is a cross-sectional view of FIG. 4.

A cross-sectional view of the EA converter 100 is shown in FIG. 5. The elongated inductor 120 is vertically coupled (VC) to another elongated inductor 121 mounted on an opposite side of the substrate. The inductors 120, 121 have the same shape so that the inductors are mirror images on opposite sides of substrate 50. In one embodiment the elongated inductor 120 represents Lo1 of FIG. 1 and elongated inductor 121 represents Lo2 of FIG. 1. The inductors 120, 121 are positioned such that magnetic flux generated by inductor 121 cancels magnetic flux generated by the inductor 120 as will be described when referring to FIG. 11. If desired, the inductor 121 may enclose a portion of the other circuitry 200 of the EA power converter 100. For other electrical systems requiring inductors, the EA architecture with vertical coupled inductors is useful for reducing system size.

Figure 6:
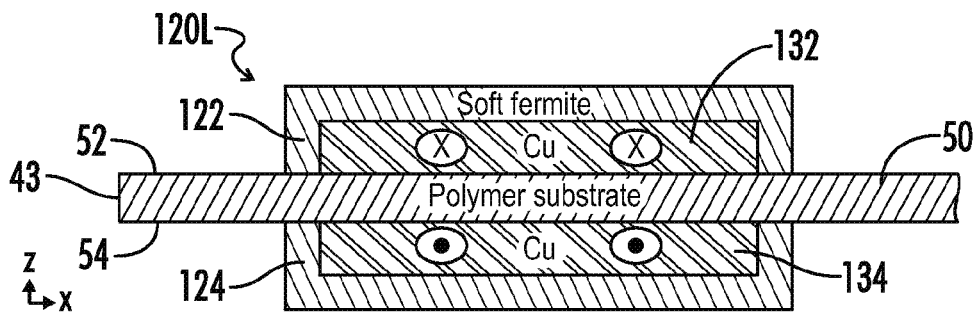
FIG. 6 illustrates a vertically coupled inductor for a switching converter in accordance with the present disclosure.

FIG. 6 shows a view of left end the cross section shown in FIG. 6. The left side 120L of the inductor 120 comprises a first conductor 132 covered by a first ferrite 122. The inductor 121 comprises a second conductor 134 covered by a second ferrite 124. The circled 'x' on first conductor 132 shows an inward current flow as will be discussed later when viewing FIG. 11. Current is shown flowing outward, indicated by the circled 'dot', from the second conductor 134. The inductors are fabricated by depositing a conductor on substrate 50 followed by depositing a magnetic material 122, such as a soft ferrite.

In one embodiment, the EA converter 100 has a substrate with a length (measured in the y-direction) and width (measured in the x-direction), around 25% less than the length and width of a substrate for the conventional converter 40 of FIG. 2. Such decreases in length and width are possible because of the enclosed architecture provided by the U-shape of the inductors 120, 121 and the electromagnetic cancellation properties of VC inductors. In other embodiments, other size differences are possible.

Figure 7:
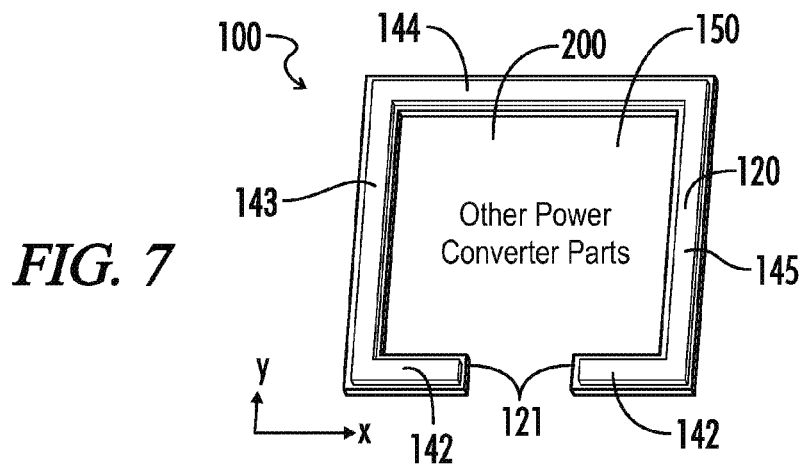
FIG. 7 illustrates an embodiment of an inductor configured in an enclosed architecture in accordance with the present disclosure.
Figure 8:
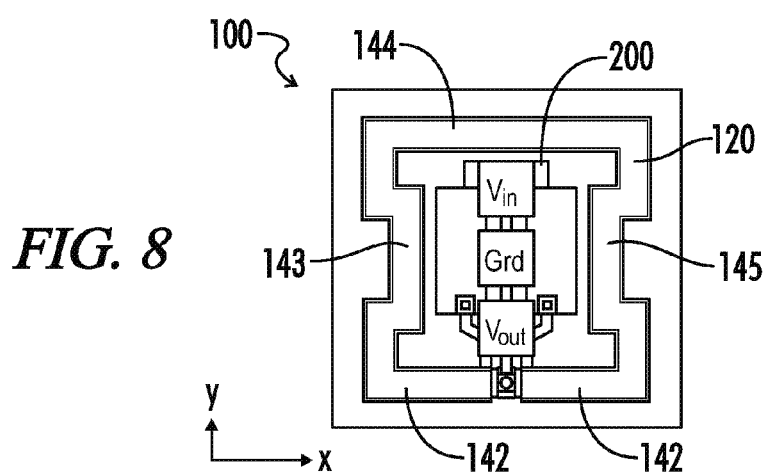
FIG. 8 illustrates another embodiment of a switching converter having an enclosed architecture.
Figure 9:
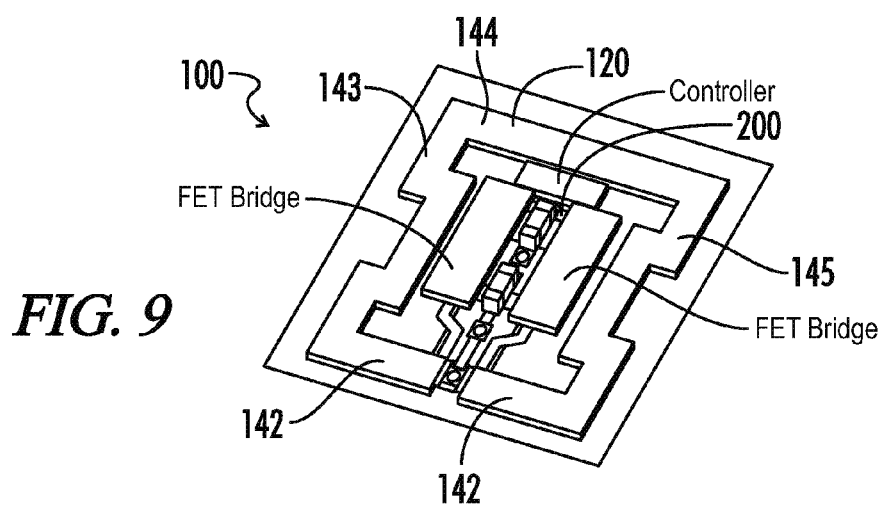
FIG. 9 illustrates an additional embodiment a switching converter having an enclosed architecture.

In the embodiment of FIG. 4, the EA converter 100 has vertically coupled (VC) inductors 120, 121 and electrical components 200 enclosed by the inductors. In other embodiments the enclosed architecture has inductors on the same side of the substrate 50. Other embodiments may use the vertically coupled inductors having other shapes. VC inductors with the U shape are shown in FIG. 7. Other embodiments of EA converters are shown in FIG. 8 and FIG. 9. Because the inductance of an inductor depends in part on the length of the metallic trace, such as conductor 132, a geometry pattern to get more length than is provided by the U shape is used in other embodiments.

Figure 10:
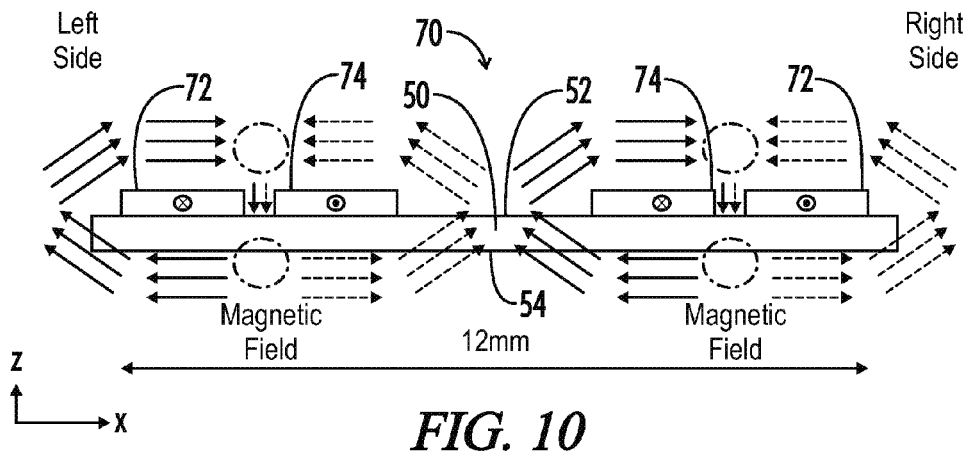
FIG. 10 is cross-sectional view of conventional inductors formed on a substrate.

FIG. 10 shows a cross sectional view of conventional inductors 70 fabricated by making conductor deposits on substrate 50. A first conductor 72 goes along the outer edge of a top surface 52 of the substrate 50 and forms a first conventional inductor. On the left edge of the substrate 50, current is shown flowing inward in the first conductor 72. On the right edge of the substrate, current is shown flowing outward from the first conductor 72. A second conductor 74 forms a second conventional inductor having currents flowing outward near the left side of the substrate 50 and flowing inward near the right side of the substrate. Current flowing in the inductors generates a magnetic field having directions as indicated by the arrowed lines. Because the magnetic field is additive, strong magnetic fields exist near the conventional inductor 70 when currents are flowing as shown in conductors 72, 74. These strong magnetic fields induce unwanted voltages into components, such as power converter components 200, if they are placed too close to the conventional inductors 70.

Figure 11:
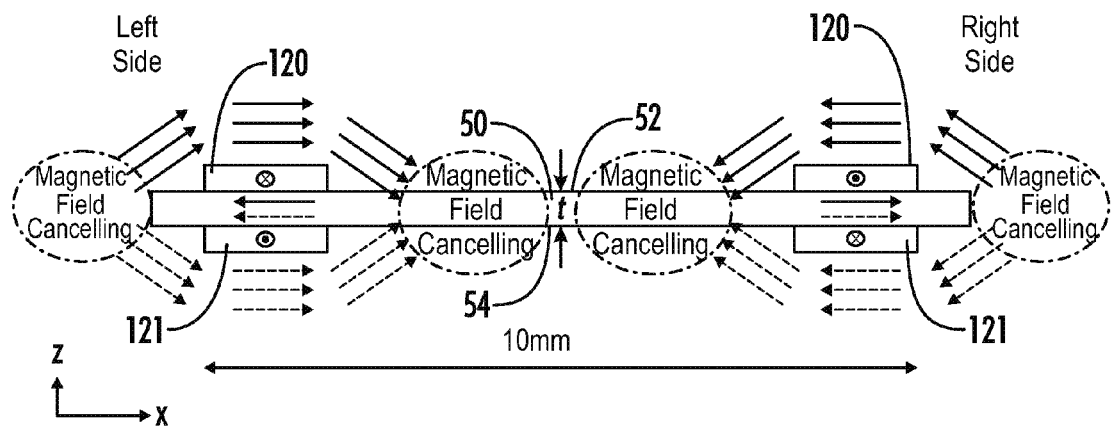
FIG. 11 is cross-sectional view of vertically coupled inductors formed on a substrate in accordance with the present disclosure.

The vertically coupled inductors 120, 121 in FIG. 11 have currents flowing in the directions shown as was described when discussing FIG. 6. The magnetic fields generated by currents flowing in the inductors 120, 121 have a canceling effect so there is little electromagnetic energy within the U-shaped enclosures formed by the inductors 120, 121. Hence, electronic components, such as other components 200, can be placed near either of the inductors 120, 121 without being impaired by electromagnetic induced voltages.

For other embodiments of converters more than one VC inductor may be placed on the substrate. In other embodiments of the converter, conductors connecting circuit elements may be placed on opposite sides of the substrate in a mirror image arrangement thereby having the electromagnetic cancellation property as described for VC inductors 120, 121. The EA as described for the converter 100 in FIG. 4 may be used for other systems and converters not having VC inductors. Although the substrate 50 as shown in the embodiment of FIG. 4 is dimensioned for holding components of a single converter, it is possible in other embodiments to have a larger substrate that has one or more additional converters and other electronic components. Converters may be connected in series or parallel to provide desired voltages and currents. Converters may also be stacked vertically when connected in parallel and series arrangements. In other embodiments, a large enclosed converter may enclose one or more smaller power converters. Enclosed converters may also share one or more coupled conductors.

Although the disclosure is described in several embodiments, a variety of changes and modifications would be apparent to those skilled in the art without departing from the spirit and scope of the disclosure. Note, in particular, that the exemplary architectures described could also be used to form transformers. In addition, the converter circuitry 10 shown by FIG. 1 is exemplary. Other types of power converters, including power converters other than DC-DC converters, may be configured with elongated VC inductors that enclose electronic circuitry.

The invention claimed is:

1. A power converter, comprising:
   a substrate having a first surface and a second surface;
   a first elongated inductor formed on the first surface of the substrate, wherein the first elongated inductor has at least a first leg, a second leg, and a third leg that define an interior region within the first elongated inductor;
   converter circuitry mounted on the first surface of the substrate, wherein at least a portion of the converter circuitry is within the interior region of the first elongated inductor between the first leg and the third leg; and
   a second elongated inductor formed on the second surface of the substrate, the second elongated inductor mirroring the first elongated inductor such that a magnetic flux generated by the first elongated inductor cancels a magnetic flux generated by the second elongated inductor in the interior region in which the portion of the converter circuitry is located,
   wherein the converter circuitry and the inductors function as a power converter.

2. The power converter of claim 1, wherein the first elongated inductor comprises a conductor covered by a ferrite.

3. The power converter of claim 1, wherein the power converter is configured to receive an input voltage and to provide an output voltage based on the input voltage, wherein the input voltage is a direct current (DC) voltage with a first value and the output voltage is a DC voltage with a second value, and wherein the second value is less than the first value.

4. The power converter of claim 1, wherein the power converter is configured to receive an input voltage and to provide an output voltage based on the input voltage, wherein the input voltage is an alternating current (AC) voltage and the AC voltage is converted to a direct current (DC) voltage by a rectifier.

5. The power converter of claim 1, wherein the first elongated inductor encloses the converter components.

6. The power converter of claim 1, wherein the first surface is opposite of the second surface.

7. The power converter of claim 1, wherein the portion of the circuitry between the first and third legs comprises a controller.

8. The power converter of claim 1, wherein the portion of the circuitry between the first and third legs comprises at least one capacitor.

9. The power converter of claim 1, wherein the portion of the circuitry between the first and third legs comprises at least one switching bridge.

10. The power converter of claim 1, wherein the first, second, and third legs form a turn of a conductive coil of the first elongated inductor, and wherein the second leg electrically connects the first leg to the third leg.

11. The power converter of claim 1, wherein the portion of the converter circuitry is in a plane with the first leg, the second leg, and the third leg, and wherein the plane is parallel to the first surface of the substrate.

12. A power converter, comprising:
    a substrate having a first surface and a second surface;
    a first elongated inductor positioned on a first surface of the substrate, wherein the first elongated inductor has at least a first leg, a second leg, and a third leg that (1) form at least one turn of the first elongated inductor and (2) define an interior region within the first elongated inductor;
    converter circuitry positioned on the substrate, wherein at least a portion of the converter circuitry is within the interior region of the first elongated inductor between the first leg and the third leg; and
    a second elongated inductor positioned on the second surface of the substrate, the second elongated inductor mirroring the first elongated inductor such that a magnetic flux generated by the first elongated inductor cancels a magnetic flux generated by the second elongated inductor in the interior region in which the portion of the converter circuitry is located,
    wherein the converter circuitry and the inductors function as a power converter.

* * * * *